United States Patent
Oberlin et al.

(10) Patent No.: US 9,692,663 B2
(45) Date of Patent: Jun. 27, 2017

(54) METHODS, SYSTEMS, AND COMPUTER PROGRAM PRODUCTS FOR USER SIDE OPTIMIZATION OF ACQUISITION OF VIRTUALIZED RESOURCES

(71) Applicant: CA, INC., Islandia, NY (US)

(72) Inventors: Steven M. Oberlin, Hood River, OR (US); Douglas M. Neuse, Austin, TX (US); Kenneth C. Zink, Austin, TX (US); Theodore Lehr, Austin, TX (US)

(73) Assignee: CA, INC., Islandia, NY (US)

( * ) Notice: Subject to any disclaimer, the term of this patent is extended or adjusted under 35 U.S.C. 154(b) by 338 days.

(21) Appl. No.: 14/186,499

(22) Filed: Feb. 21, 2014

(65) Prior Publication Data

US 2015/0244595 A1 Aug. 27, 2015

(51) Int. Cl.
*H04L 12/24* (2006.01)
(52) U.S. Cl.
CPC ...... *H04L 41/5025* (2013.01); *H04L 41/0896* (2013.01); *H04L 41/5096* (2013.01)
(58) Field of Classification Search
CPC . H04L 41/5019; H04L 43/08; H04L 41/5025; H04L 41/0896; H04L 41/5096; G06F 9/455; G06F 11/3006; G06F 17/30864; G06F 8/60; G06F 8/65; G06F 8/70; G06F 9/00; G06F 9/4445; G06F 9/466; G06F 9/4843; G06F 9/5044; G06F 9/505; G06F 9/5077

USPC .......... 709/224, 225–245; 707/103
See application file for complete search history.

(56) References Cited

U.S. PATENT DOCUMENTS

| | | | | |
|---|---|---|---|---|
| 2003/0061262 A1* | 3/2003 | Hahn | ...................... | G06F 9/468 718/104 |
| 2004/0019894 A1* | 1/2004 | Willard | ............... | G06F 11/3495 719/317 |
| 2004/0243915 A1* | 12/2004 | Doyle | ................... | G06F 11/203 714/796 |
| 2005/0234937 A1* | 10/2005 | Ernest | ................. | G06F 11/3495 |
| 2012/0166634 A1* | 6/2012 | Baumback | .............. | H04L 43/08 709/224 |

\* cited by examiner

*Primary Examiner* — David Lazaro
*Assistant Examiner* — Berhanu Shitayewoldetsad
(74) *Attorney, Agent, or Firm* — Sage Patent Group (57) ABSTRACT

A method includes receiving a request for access to an instance of a computing resource, the request having a performance standard associated therewith, requesting the instance of the computing resource from a computing resource provider, evaluating a performance of the instance of the computing resource provided by the computing resource provider to determine if the performance of the instance of the computing resource complies with the performance standard associated with the request, and providing access to the instance of the computing resource provided by the computing resource provider responsive to a determination that the performance of the instance of the computing resource complies with the performance standard associated with the request. Related systems and computer program products are also disclosed.

11 Claims, 9 Drawing Sheets

METHODS, SYSTEMS, AND COMPUTER PROGRAM PRODUCTS FOR USER SIDE OPTIMIZATION OF ACQUISITION OF VIRTUALIZED RESOURCES

BACKGROUND

The present disclosure relates to computing systems, and, in particular, to providing access to computing resources in a virtualized computing environment.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

Figure 1:
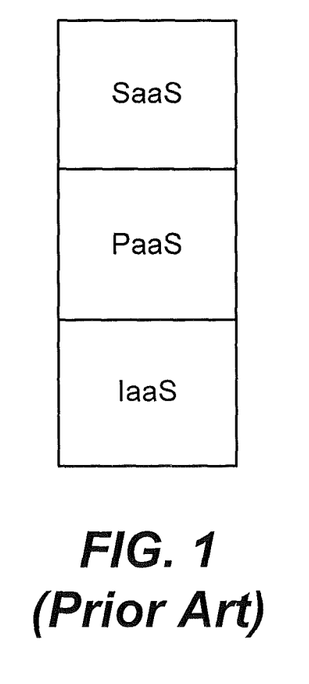
FIG. 1 is a block diagram that illustrates a cloud computing paradigm.

FIG. 1 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Virtualized computing environments may be used to provide computing resources to end users. In a cloud computing environment, the physical hardware configuration is hidden from the end user. Cloud computing systems may include servers, network storage devices, routers, gateways, communication links, and other devices. Because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Cloud computing service providers typically manage large pools of physical servers, networking equipment, and storage equipment and make a business of renting virtualized slices of physical capacity to customers. Cloud computing service providers typically use their own resource management algorithms to pack customer virtualized units of capacity into physical resources to maximize utilization and efficiency metrics that are most beneficial to their business models. Despite the specification of granular capacity offerings by cloud computing service providers based on defined units of capacity, from the perspective of a given customer, the performance of the rented unit of service capacity is not independent of a) the activities and demand of other customer services that are sharing the same physical resource and b) the underlying physical hardware upon which the virtual machines are deployed and often may not deliver the specified level of performance. Benchmarking has shown that the achieved performance of an actual instance rented from cloud computing service provider can be highly variable and as low as half the advertised instance performance—a difference comparable to the scaling granularity of the offered units of capacity. This difference can be ascribed to a) interference effects from the activities of other customer instances assigned by the cloud computing service provider to share the same physical resources, effects that are currently beyond the ability of a customer to control and b) differences in the underlying hardware resources of different instances of the same virtual machine type. The result is a large potential inefficiency in the spending of cloud computing customers on service capacity.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

In some embodiments of the inventive subject matter, a method comprises receiving a request for access to an instance of a computing resource, the request having a performance standard associated therewith, requesting the instance of the computing resource from a computing resource provider, evaluating performance of the instance of the computing resource provided by the computing resource provider to determine if the performance of the instance of the computing resource complies with the performance standard associated with the request, and providing access to the instance of the computing resource provided by the computing resource provider responsive to a determination that the performance of the instance of the computing resource complies with the performance standard associated with the request.

The performance standard may specify one or more of a set of resource capacity requirements, such as memory capacity in gigabytes, number of processors, CPU computing capacity in SPECint_rate2006 or some other portable measure, external storage (e.g., disk) capacity in gigabytes, network throughput in megabytes per second and response time requirements.

In other embodiments, the method further comprises periodically monitoring the performance of the instance of the computing resource after providing access to the instance of the computing resource to determine if the performance of the instance of the computing resource continues to comply with the performance standard associated with the request.

In still other embodiments, the method further comprises periodically evaluating performance of new instances of computing resources provided by the computing resource provider.

In still other embodiments, periodically evaluating the performance of new instances of computing resources provided by the computing resource provider comprises periodically evaluating the performance of new instances of computing resources provided by a plurality of computing resource providers.

In still other embodiments the method further comprises determining if the performance of one of the new instances of computing resources provided by a second one of the plurality of computing resource providers exceeds the performance of the instance of the computing resource provided by the first one of the plurality of computing resource providers while not exceeding a cost threshold, retiring the instance of the computing resource provided by the first one of the plurality of computing resource providers responsive to determining that the performance of the one of the new instances of the computing resources exceeds the performance of the instance of the computing resource while not exceeding the cost threshold, and providing access to the one of the new instances of the computing resources provided by the second one of the plurality of computing resource providers responsive to determining that the performance of the one of the new instances of the computing resources exceeds the performance of the instance of the computing resource while not exceeding the cost threshold.

In still other embodiment the performance standard comprises a cost component.

In still other embodiments, the method further comprises retiring the instance of the computing resource provided by the computing resource provider responsive to determining that the performance of the instance of the computing resource no longer complies with the performance standard associated with the request, and providing access to one of the new instances of the computing resources provided by the computing resource provider responsive to determining that the performance of the one of the new instances of the computing resources complies with the performance standard associated with the request.

In further embodiments of the inventive subject matter, a method comprises requesting instances of computing resources from a computing resource provider, evaluating performance of each of the instances of computing resources to determine if the respective instance of the computing resource complies with a defined performance standard, maintaining the instances of the computing resources that comply with the defined performance standard in a first pool of resources, maintaining the instances of the computing resources that fail to comply with the defined performance standard in a second pool of resources, receiving a request for access to an instance of a computing resource, and providing access to one of the instances of the computing resources from the first pool of resources responsive to receiving the request.

In still further embodiments, the method further comprises determining if the request is associated with a work unit that is preemptable. Providing access to one of the instances of the computing resources comprises providing access to one of the instances of the computing resources from one of the first pool of resources and the second pool of resources responsive to determining that the request is associated with a work unit that is preemptable.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims Moreover, it is intended that all embodiments disclosed herein can be implemented separately or combined in any way and/or combination.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Embodiments of the inventive subject matter are described herein with respect to computing resources being provided by a computing resource provider. As used herein, a computing resource may include, but is not limited to, a virtual machine, a computer processor, a data storage element, such as a memory, a database, a communication medium, a switch, a router, a data center, a host processor/system, a cluster, an application, a hypervisor, a host operating system, a guest operating system, and the like. It will be further understood that a computing resource may include portions of the aforementioned elements, for example. In this regard, a computing resource may comprise a time slice of a virtual machine or processor, a particular bandwidth of a communication medium, a portion of a memory, and/or a portion of a database.

Figure 2:
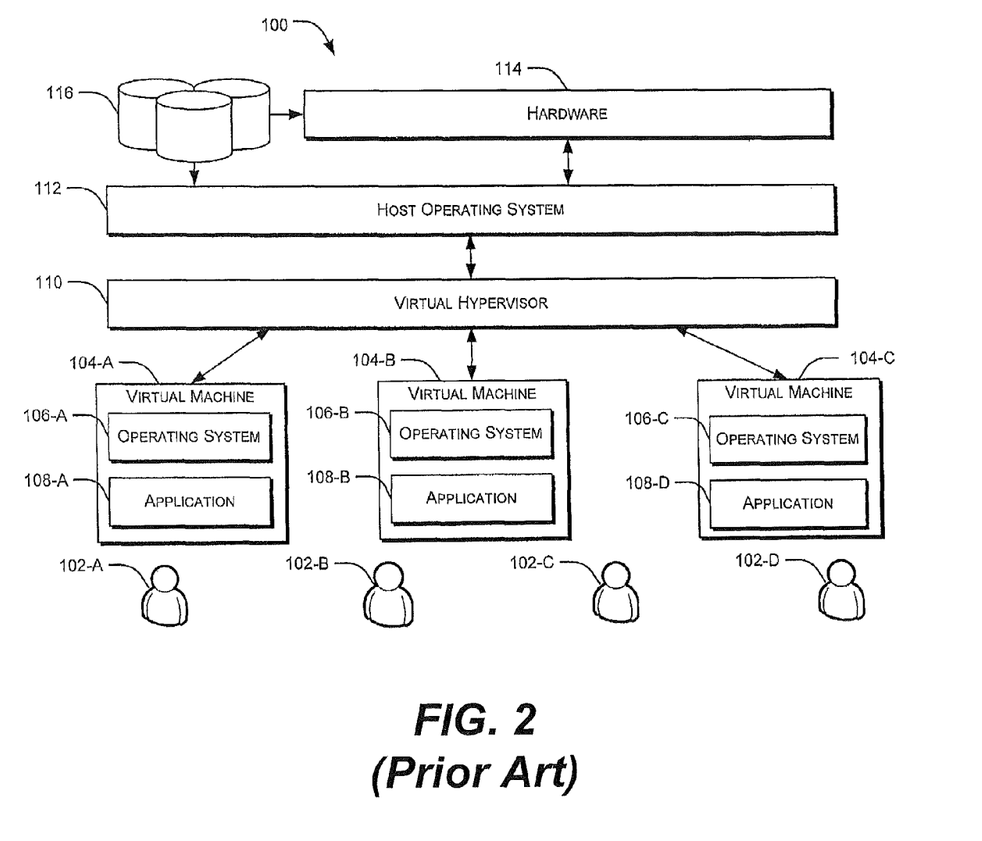
FIG. 2 is a block diagram that illustrates a virtualized computing environment.

FIG. 2 illustrates a server system 100 for a virtualized computing environment in which the inventive subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), micro-computer, handheld computer, mobile computing platform, server, or any other appropriate computer hardware. The hardware platform 114 may include computing resources, such as a central processing unit (CPU); networking controllers; communication controllers; a display unit; a program and data storage device; memory controllers; input devices (e.g., a keyboard, a mouse, etc.) and output devices, such as printers. The CPU may be any processor capable of supporting virtualization.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users 102 and is responsible for the management and coordination of activities and the sharing of the computing resources. Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs. The hypervisor 110 creates an environment for implementing a virtual machine, hosting the "guest" virtual machine. One host operating system 112 is capable of implementing multiple isolated virtual machines simultaneously.

A hypervisor 110 (which may also be known as a machine monitor or VMM) runs on the host operating system 112 and provides an interface between the virtual machines 104 and the hardware platform 114 through the host operating system 112. The hypervisor 110 virtualizes the computing system resources and facilitates the operation of the virtual machines 104. The hypervisor 110 may provide the illusion of operating at the highest priority level to the guest operating systems 106. The hypervisor 110 maps the guest operating system's priority level to a priority level lower than the top most priority level. As a result, the hypervisor 110 can intercept the guest operating system 106 to execute instructions that require virtualization assistance. Alternatively, the hypervisor 110 may emulate or actually execute the instructions on behalf of the guest operating system 106. Software operations permitting indirect interaction between the guest operating system 106 and the physical hardware platform 114 are also performed by the hypervisor 110.

Virtual machines 104 present a virtualized environment to guest operating systems 106, which in turn provide an operating environment for applications 108 and other software constructs.

The foregoing description with respect to FIG. 2 of a virtualized computing environment uses a Type 2 or hosted hypervisor 110, which runs within a conventional operating system environment. In this configuration, the hypervisor layer is disposed between the host operating system and one or more guest operating systems. It will be understood that the hypervisor can also be implemented as a Type 1 hypervisor, which may be called a native or bare metal hypervisor. A Type 1 hypervisor runs directly on the host's hardware to control the hardware and manage guest operating systems. Thus, a Type 1 hypervisor layer is disposed between the hardware and one or more guest operating systems. In accordance with various embodiments of the present inventive concept, a Type 1 or a Type 2 hypervisor can be used to implement a virtualized computing environment.

Figure 3:
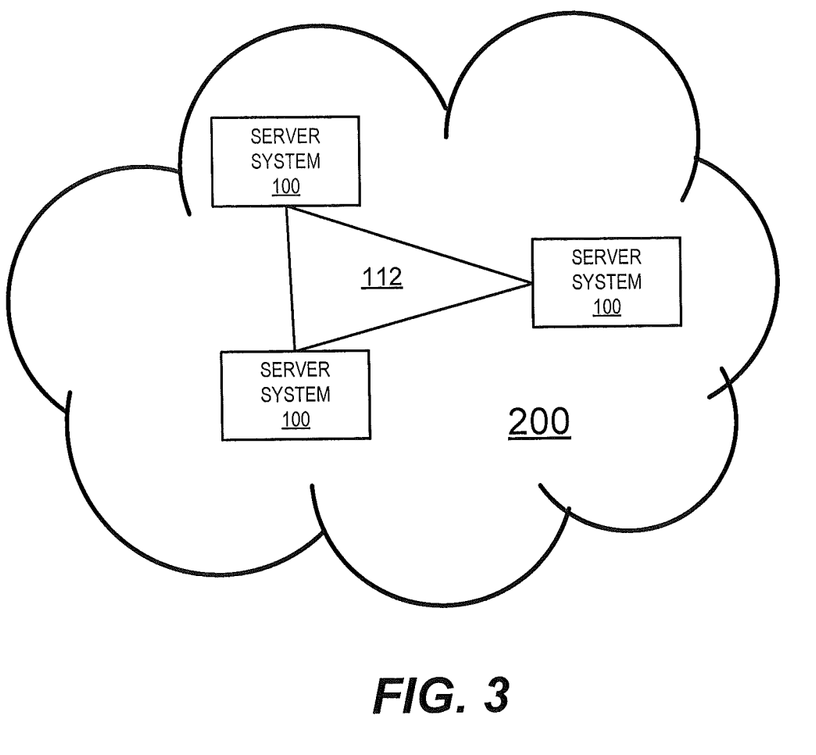
FIG. 3 is a block diagram that illustrates a cloud computing environment.

Referring to FIG. 3, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, micro-computers, workstations, Unix-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

Virtual machines and/or other objects in a virtualization environment can be grouped into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Any desired number of clusters can be defined subject to system limitations, and each of the clusters can include any desired number of virtual machines subject to server limitations.

Virtual machines can be deployed in particular virtualization environments and organized to increase the efficiency of operating and/or managing a virtual computing environment. For example, virtual machines may be grouped into clusters to provide load balancing across multiple servers.

Virtual machines within a same cluster can be managed by a single virtualization environment manager to have the same or similar resource access privileges (e.g., processor utilization, priority, memory allocation, communication interface access privileges, etc.), while virtual machines within different clusters can have different resource access privileges.

Virtual machines that are deployed within a single cluster may share physical resources within a server. For example, virtual machines that are deployed within a single cluster may share physical memory, storage, communication facilities and other resources or services of a server. Whenever computing resources are shared, there is the possibility that one virtual machine could intentionally or unintentionally gain access to data of another virtual machine.

Embodiments of the inventive concept may provide for a buyer-side resource allocation intermediary that performs purchase-time and periodic run-time benchmarking and quality assurance of rented cloud computing resources, which may accept/reject computing resource instances that fall short of specified performance levels. As a result, the delivered computing resource performance may be improved for a given cost to the end-user.

To their constituents, cloud IaaS provider resource management is generally viewed as a black box. A self-service customer API typically enables the purchase/rental of virtual units of capacity, which are packed into physical resources according to inscrutable policies and practices established by the computing resource provider. Embodiments of the inventive subject matter may provide for the addition of an intermediary resource manager between the customer and the computing resource provider that executes quality and performance testing of rented virtual resources to ensure that they meet minimal requirements and expectations established by the customer. Instead of interacting directly with the computing resource provider self-service API, users may purchase instances through a similar API to the intermediary resource manager. The intermediary resource manager can have several configurable behaviors, including automatically pre-purchasing instances and maintaining a configurable-size pool of acceptable computing resource instances that have been tested/assured to meet minimum performance standards, periodic re-testing and re-qualification of deployed and computing resource instances in the acceptable pool, and replacement of already-deployed or computing resource instances in the acceptable pool that have drifted below performance minimums.

In one mode of operation according to some embodiments of the inventive concept, the intermediary resource manager intercepts each computing resource instance requested by users and grades the performance by running benchmarks prior to release to the user. The intermediary resource manager may keep track of deployed instances of computing resources that fall below established minimum performance levels and periodically procure and test new computing resource instances from the computing resource service provider. If a new computing resource instance exceeds the performance of the deployed instance, the resource manager may migrate the workload to the new computing resource instance and retire the old, non-conforming (if the old computing resource instance has fallen below the minimum performance standard) or poorer performing computer resource instance. Cost may be factor in determining whether to perform a migration. For example, even if the performance of a computing resource has failed to conform to a desired user standard, if the alternative higher performing computing resource has a cost that exceeds a particular threshold, then the user may wish to retain the lower performing computing resource.

In another mode of operation according to some embodiments of the inventive concept, the intermediary resource manager is configured to automatically pre-procure one or more computer resource instances of the various types that may be required by users. The resource manager benchmarks procured computer resource instances and places them in a resource pool. New user requests for computer resource instances are satisfied from the resource pool with computer resource instances that satisfy the user requirement. Cost may also be a factor in servicing user requests. For example, a user may be satisfied with a lower performing computer resource if the associated cost is lower. The user may specify a maximum cost and seek the highest performing computer resource for that cost. In other embodiments, the user may specify a desired performance level and seek the lowest cost computer resource that meets that performance level. For efficiency, short duration transient jobs and restartable workloads, i.e., workloads that are preemptable, may be scheduled to run on resources from the resource pool to make use of their idle cycles. These work units are potentially preempted if the computing resource instance is needed elsewhere or released when the lease expires. If requests for computing resource instances outstrip verified computing resource instances available in the acceptable pool, the intermediary resource manager reverts to direct mode until it catches up with demand.

In either direct mode or pre-fetch mode, the intermediary resource manager may periodically run performance benchmarks on a deployed resource or interrogate performance monitors of the application itself to determine if the underlying computing resource instance performance has ebbed below the minimum performance standard, and, in some embodiments, procure a new, conforming computing resource instance, migrate the service to the new computing resource instance, and retire the under-performing computing resource instance.

Statistics may be gathered and retained about computing resource instance performance for use by Service Level Agreement (SLA) management to ensure that allocated performance/capacity is attaining contracted performance levels.

Figure 4:
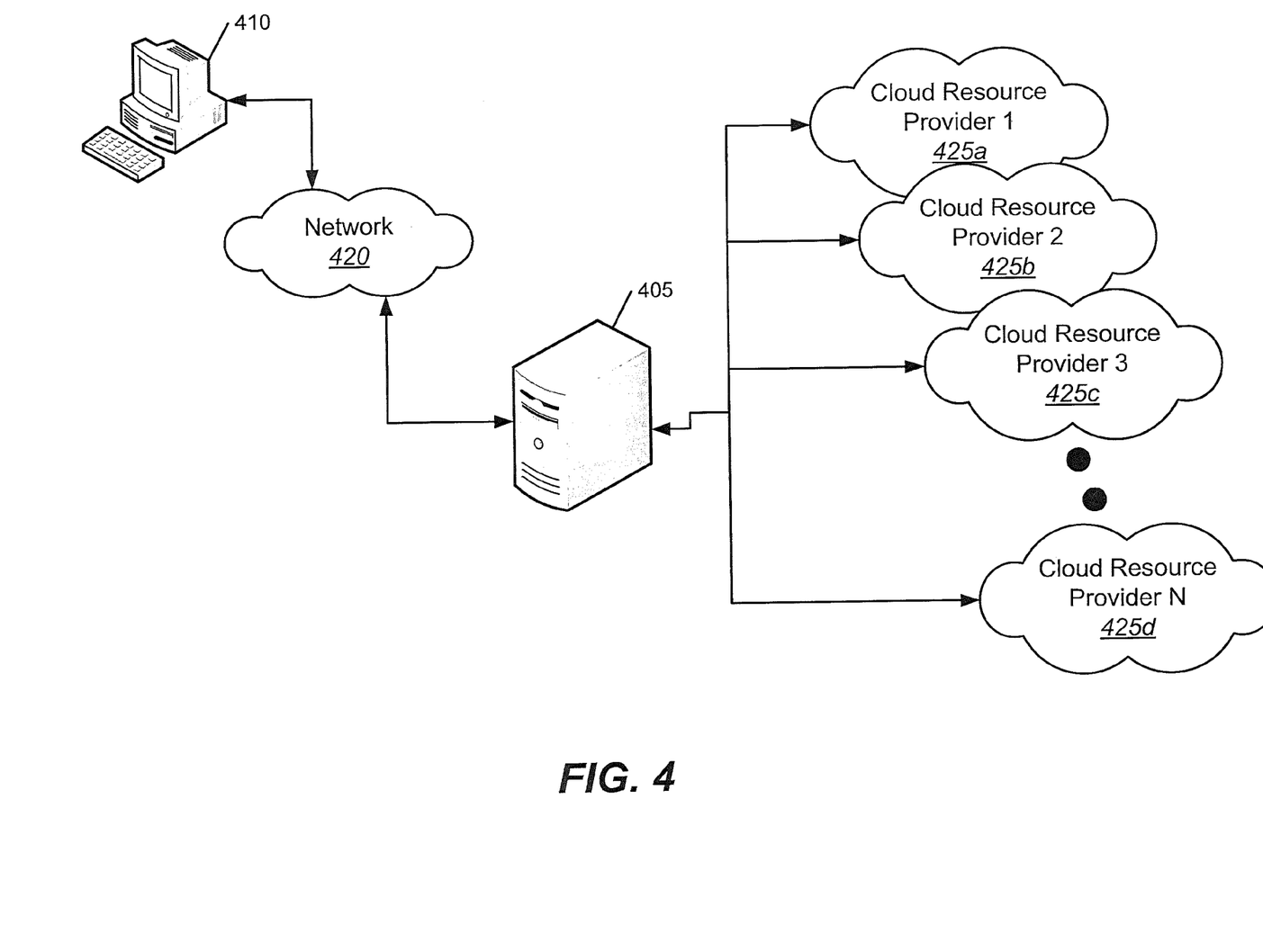
FIG. 4 is a block diagram that illustrates a system for assignment of virtual computing resources according to some embodiments of the inventive subject matter.

FIG. 4 is a block diagram that illustrates a system for assignment of virtual computing resources according to some embodiments of the inventive subject matter. As shown in FIG. 4, the system comprises a resource manager server 405 that is coupled to a user terminal 410 via a network 420. The user terminal 410 may also represent an intelligent resource acquisition system that acts on behalf of the ultimate user of the acquired resources. While only one user terminal 410 is illustrated, it will be understood that multiple user terminals may communicate with the resource manager server 405 in accordance with various embodiments of the present invention. The network 420 may be a global network, such as the Internet or other publicly accessible network. Various elements of the network 420 may be interconnected by a wide area network, a local area network, an Intranet, and/or other private network, which may not be accessible by the general public. Thus, the communication network 420 may represent a combination of public and private networks or a virtual private network (VPN). The network 420 may be a wireless network, a wireline network, or may be a combination of both wireless and wireline networks.

The intermediary resource manager server 405 is also coupled to cloud resource providers 1 through N 425a, 425b, 425c, and 425d. The cloud resource providers 425a, 425b, 425c, and 425d may be directly connected to the intermediary resource manager server 405 or may coupled to the intermediary resource manager server 405 via a communication network connection, such as the network 420 in accordance with various embodiments of the inventive subject matter. The cloud resource providers 425a, 425b, 425c, and 425d may be associated with a single entity or may be associated with multiple entities that may, for example, complete with one another. The cloud resource providers 425a, 425b, 425c, and 425d may lease computing resources to end users, such as the user terminal 410. A cloud resource provider 425a, 425b, 425c, and 425d may define a purchasable unit, which is an abstraction for some quantity of a computer resource. For example, a computing unit for lease by a cloud resource provider 425a, 425b, 425c, and 425d may represent a particular type of central processing unit operating at a particular frequency for a particular time period. Similarly, a computing unit associated with storage may represent a particular size of memory, with backup/redundancy protections, and possibly including access to a database program for organizing data in the memory. The foregoing are examples of computing resources that the cloud resource providers 425a, 425b, 425c, and 425d may provide to an end user 410 for purchase or lease. As described above, computing resources are not limited to processor time and storage and may include a variety of different types of computing and networking elements in accordance with various embodiments of the inventive subject matter.

As will be described in detail below, the intermediary resource manager server 405 may serve as an intermediary to intercept requests from the user terminal 410 to the cloud resource providers 425a, 425b, 425c, and 425d for computing resources and to obtain and evaluate computing resources from the cloud resource providers 425a, 425b, 425c, and 425d to ensure that they satisfy the performance standard expected by the end user. The end user receives improved performance as the resource manager server 405 may screen and reject those computing resources provided by one or more cloud resource providers 425a, 425b, 425c, and 425d that fail to perform according to advertised or agree upon performance levels.

Figure 5:
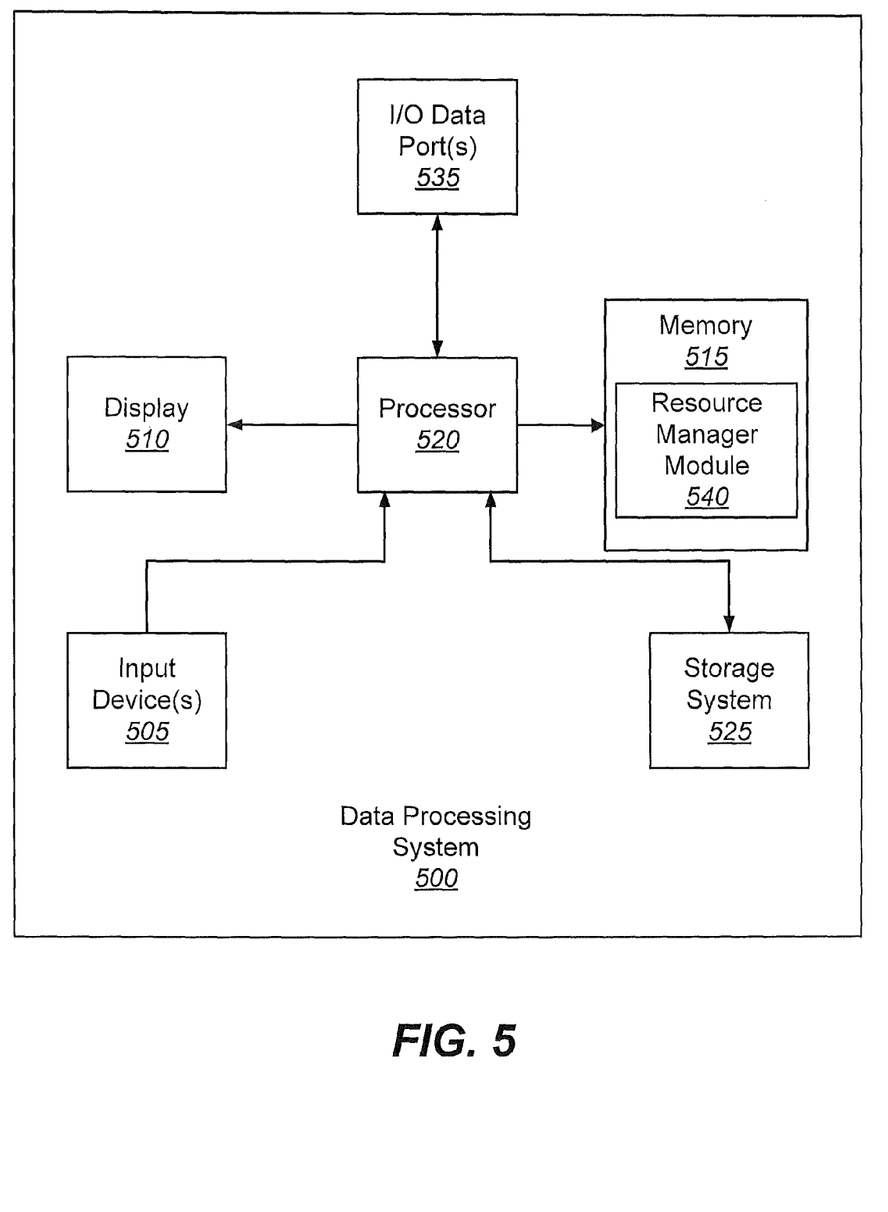
FIG. 5 is a block diagram that illustrates a data processing system that may be used to implement the resource manager server of FIG. 4 according to some embodiments of the inventive subject matter.

FIG. 5 illustrates a data processing system 500 that may include a resource manager module in accordance with some embodiments of the inventive subject matter. The data processing system 500 comprises input device(s) 505, such as a keyboard or keypad, a display 510, and a memory 515 that communicate with a processor 520. The data processing system 500 may further comprise a storage system 525, and an I/O data port(s) 535 that also communicate with the processor 520. The storage system 525 may include removable and/or fixed media, such as floppy disks, ZIP drives, hard disks, or the like as well as virtual storage such as a RAMDISK. The I/O data port(s) 535 may be used to transfer information between the data processing system 500 and another computer system or a network (e.g., the Internet). These components may be conventional components, such as those used in many conventional computing devices, and their functionality, with respect to conventional operations, is generally known to those skilled in the art. The memory 515 may be configured with a resource manager module module 540 that may be used to acquire and evaluate the performance of computing resources from one or more cloud resource providers 425a, 425b, 425c, and 425d before providing access to the computing resource(s) to an end user.

Figure 6:
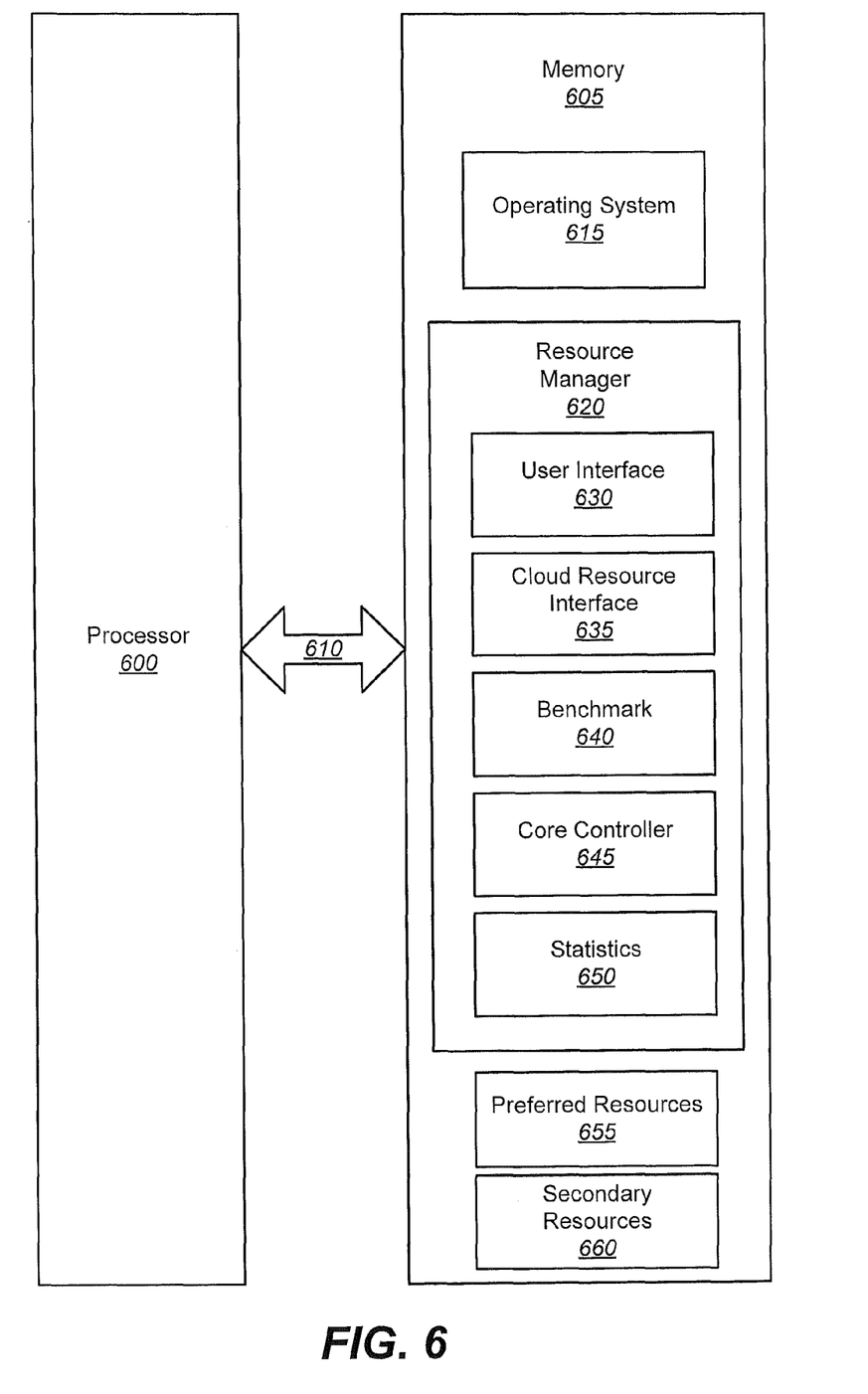
FIG. 6 is a block diagram that illustrates a software/hardware architecture for a resource manager server in accordance with some embodiments of the present inventive subject matter.

FIG. 6 illustrates a processor 600 and memory 605 that may be used in embodiments of data processing systems, such as the data processing system 500 of FIG. 5, for managing the acquisition of computing resources from one or more cloud resource providers in accordance with some embodiments of the inventive subject matter. The processor 600 communicates with the memory 605 via an address/data bus 610. The processor 600 may be, for example, a commercially available or custom microprocessor. The memory 605 is representative of the one or more memory devices containing the software and data used to provision software in accordance with some embodiments of the present invention. The memory 605 may include, but is not limited to, the following types of devices: cache, ROM, PROM, EPROM, EEPROM, flash, SRAM, and DRAM.

As shown in FIG. 6, the memory 605 may contain up to four or more categories of software and/or data: an operating system 615, a resource manager 620, a preferred resources pool 655, and a secondary resources pool 660. The operating system 615 generally controls the operation of the data processing system. In particular, the operating system 615 may manage the data processing system's software and/or hardware resources and may coordinate execution of programs by the processor 600. The resource manager 620 comprises a user interface module 630, a cloud resource interface module 635, a benchmark module 640, a core controller module 645, and a statistics module 650.

The user interface module 630 may provide an interface to user terminals, such as user terminal 410 of FIG. 4 to receive requests for computing resource(s) from one or more cloud resource providers 425a, 425b, 425c, and 425d. The user interface 630 may also allow an end user to provide input to the resource manager 620 with respect to minimum performance standard(s) and/or capacities expected by the end user. In some embodiments, the end user may have contracted with one or more cloud resource providers 425a, 425b, 425c, and 425d through an SLA that specifies various performance metrics, capacities, and the like for the resources leased by the end user from the cloud resource provider(s) 425a, 425b, 425c, and 425d.

The cloud resource interface module 635 may provide an interface to the cloud resource providers 425a, 425b, 425c, and 425d to acquire computing resources from them, which can be evaluated to determine whether the computing resources comply with minimum standards of performance before they are provided to the end users, which have pending requests for the resources.

The benchmark module 640 may evaluate the performance of computing resources acquired from the cloud resource providers 425a, 425b, 425c, and 425d to determine if they meet the performance and/or capacity standards expected by the end users. The benchmark module 640 may also monitor the performance of computing resources to which an end user has already been provided access to ensure that the performance and/or capacity of the computing resource has not degraded over time and fallen below the minimum performance/capacity standard. In other embodiments, even if the performance/capacity of the computing resource has not fallen below the minimum standard level, the benchmark module 640 may have already certified another computing resource whose performance/capacity exceeds that of a computing resource already acquired by an end user. In this case, the computing resource already assigned to the end user may be retired and replaced with the higher performing computing resource. In determining whether to retire a computing resource and replace the computing resource with a higher performing computing resource, various factors may be considered including the cost of the higher performing computing resource. For example, a user may be willing to migrate to a higher performing computing resource if the cost does not exceed a cost threshold. The user may, for example, set various rules, such as a desire for the highest performing computing resource that does not exceed a maximum cost threshold.

The core controller module 645 may coordinate the execution of the various modules comprising the resource manager 620 and may be used to process the performance data collected by the benchmark module 640 to make decisions.

The statistics module 650 may process the performance data collected via the benchmark module 640 and may be used to evaluate whether agreements between an end user and one or more cloud resource providers 425a, 425b, 425c, and 425d, such as SLA agreements, have been complied with.

The preferred resources pool 655 may comprise a pool of computing resources of various types that are frequently requested by end users and are pre-fetched from the cloud resource providers 425a, 425b, 425c, and 425d by the resource manager 620. These computing resources have been pre-screened to meet defined performance standards according to their respective types. A computing resource that fails to comply with the associated defined performance standard is placed in the secondary resource pool 660.

Although FIG. 6 illustrates exemplary hardware/software architectures that may be used in data processing systems, such as the data processing system 500 of FIG. 5, for managing the acquisition of computing resources from one or more cloud resource providers, it will be understood that the present invention is not limited to such a configuration but is intended to encompass any configuration capable of carrying out operations described herein. Moreover, the functionality of the data processing system 500 of FIG. 5 and the hardware/software architecture of FIG. 6 may be implemented as a single processor system, a multi-processor system, a multi-core processor system, a network of stand-alone computer systems, or one or more virtual machines in accordance with various embodiments.

Computer program code for carrying out operations of data processing systems discussed above with respect to FIG. 6 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 7:
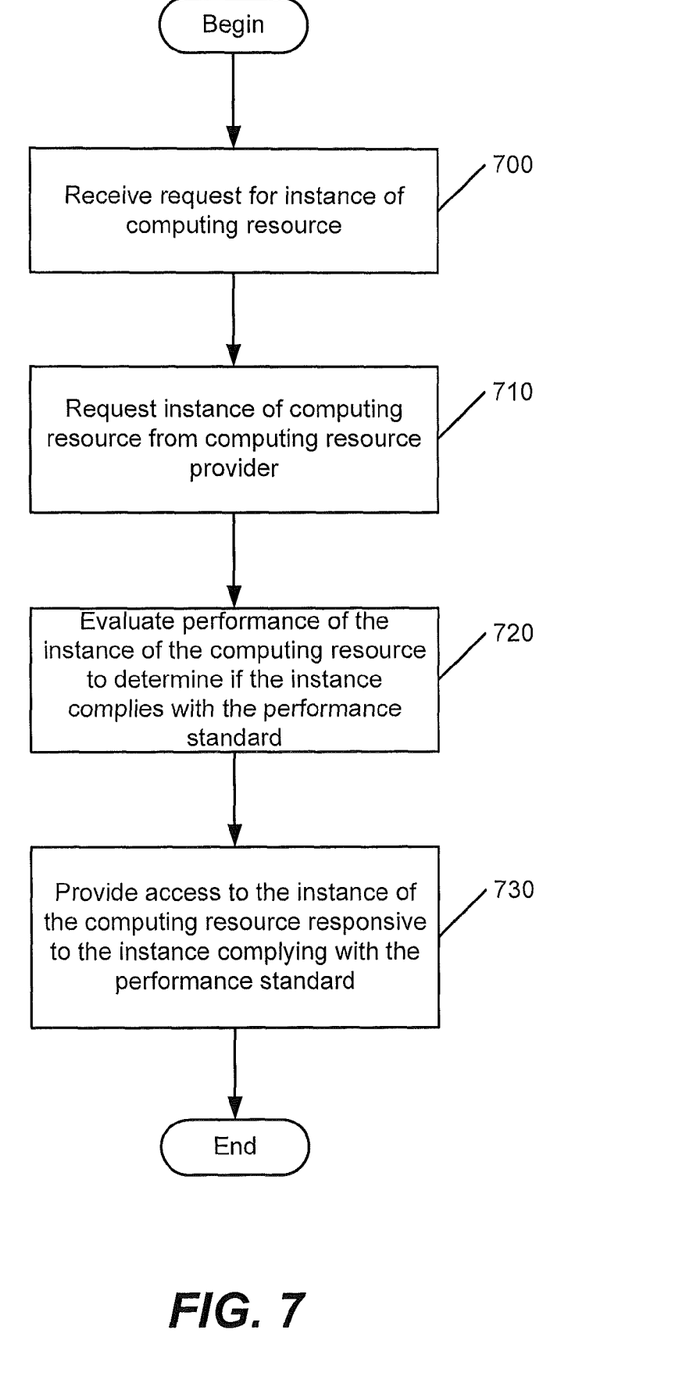
FIGS. 7-9 are flowcharts that illustrate operations for acquisition of virtual computing resources according to some embodiments of the inventive subject matter.
Figure 8:
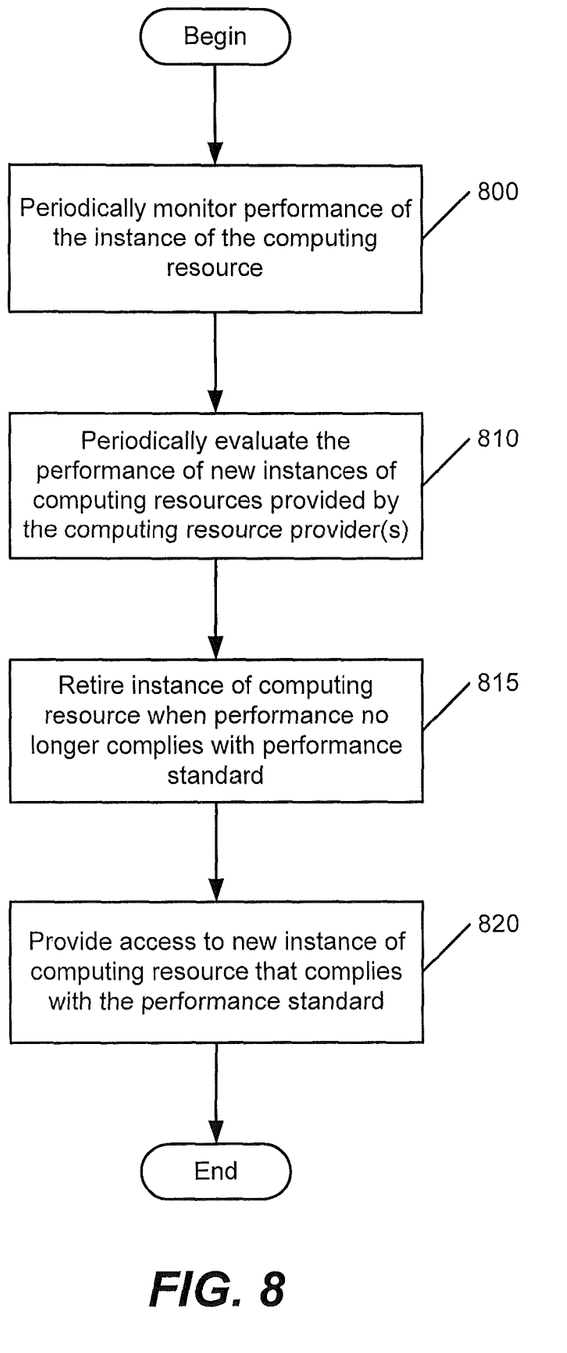
Figure 9:
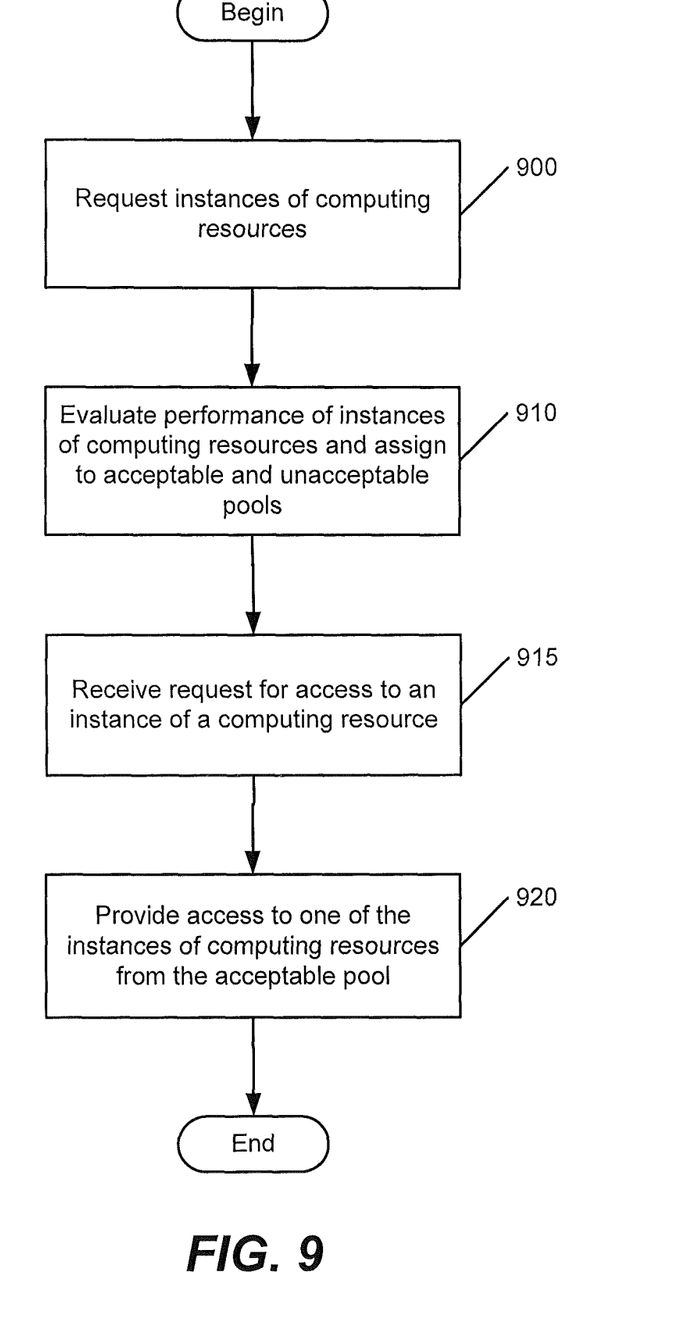

FIGS. 7-9 are flowcharts that illustrate operations for acquisition of virtualized computing resources according to some embodiments of the inventive subject matter. FIG. 7 illustrates operations associated with a "direct mode" of operation of the resource manager 405 of FIG. 4. In the "direct mode" of operation, the resource manager 405 acquires an instance of a computing resource from one of the cloud resource providers 425*a*, 425*b*, 425*c*, and 425*d* in response to receiving a request from an end user via user terminal 410. This contrasts with the "pre-fetch mode" of operation where the resource manager 405 acquires instances of computing resources from the cloud resource providers 425*a*, 425*b*, 425*c*, and 425*d* in advance and screens them for compliance with performance/capacity standards according to their types. Those instances of computing resources that comply or satisfy the performance/capacity standards are placed in the preferred resources pool 655 and those that fail to comply or satisfy the performance/capacity standards are placed in the secondary resources pool 660. The resource manager 405 fulfills requests for computing resources from end users by providing access to instances of computing resources from the preferred resources pool 655 and/or the secondary resources pool 660.

Referring to FIG. 7, operations begin at block 700 where the resource manager 620 receives a request for an instance of a computing resource from a user terminal 410 via the user interface module 630. The request may have a performance standard associated therewith that may be communicated with the request or otherwise pre-defined with the resource manager 620. The performance standard may define one or more performance metrics, capacities, and the like that the requested computing resource should satisfy. In addition, the request may have cost information associated therewith. For example, the user may be unwilling to accept a cost greater than a particular cost threshold and is willing to accept lower performance rather than exceed the cost threshold. In some embodiments, the performance standard may be formalized by way of an SLA with the cloud resource provider 425*a*, 425*b*, 425*c*, and 425*d*. At block 710, the cloud resource interface module 635 requests an instance of the computing resource from one of the cloud resource providers 425*a*, 425*b*, 425*c*, and 425*d*. These cloud resource providers 425*a*, 425*b*, 425*c*, and 425*d* may also be called computing resource providers as they provide computing resources, typically for lease, to end users. The benchmark module 640 evaluates the performance of the computing resource acquired from one of the cloud resource providers 425*a*, 425*b*, 425*c*, and 425*d* to determine if the performance of the computing resource complies with the performance standard at block 720 including any cost constraints. At block 730, the core controller module 645 provides access to the instance of the computing resource to the end user if the instance of the computing resource complies with the performance standard and/or cost constraints. The resource manager 620 may, therefore, reject instances of computing resources that fail to meet a minimum performance standard and/or cost constraints expected by an end user and accept only those instances of computing resources that comply with the minimum performance standard. The end user may have increased confidence that the performance level that the end user is paying for is actually being provided by the cloud resource providers 425*a*, 425*b*, 425*c*, and 425*d*.

Even though the performance of an instance of a computing resource may satisfy a particular performance standard initially, the performance may nevertheless degrade over time. Referring to FIG. 8, the benchmark module 640 may periodically monitor the performance of an instance of a computing resource to which an end user has already been provided access at block 800. The benchmark module 640 may also periodically evaluate new instances of computing resources provided by one or more of the cloud resource providers 425*a*, 425*b*, 425*c*, and 425*d* at block 810. When the core controller 645 determines that the performance of an instance of a computing resource already assigned to an end user no longer complies with the associated performance standard, the instance of the computing resource may be retired at block 815 and access may be provided to a new instance of a computing resource at block 820, which was determined at block 810 to comply with the performance standard and/or any cost constraints. Although the embodiments described in blocks 815 and 820 refer to an instance of a computing resource ceasing to comply with a defined performance standard, in other embodiments, a first instance of a computing resource assigned to an end user may be replaced by another instance of a computing resource whose performance exceeds that of the first instance of the computing resource and complies with any cost constraints even if the performance of the first instance of the computing resource still meets the minimum performance standard.

FIG. 9 illustrates operations associated with the "pre-fetch mode" of operation of the resource manager 405 of FIG. 4. Operations begin at block 900 where the cloud resource interface 635 requests instances of computing resources of various types from the cloud resource providers 425*a*, 425*b*, 425*c*, and 425*d*. The benchmark module 640 evaluates the performance of the instances of computing resources acquired at block 900 to determine if they comply with the performance standards associated with their type. Those instances of computing resources whose performance complies with the relevant performance standard are placed in the preferred resources pool 655 and those instances of computing resources whose performance fails to comply with the relevant performance standard are placed in the secondary resources pool 660 at block 910. The operations of blocks 900 and 910 may serve to provide a set of pre-screened instances of computing resources that are ready to be provided to end users upon request. Such pre-screening may have an associated cost, however, as the instances of computing resources must typically be leased and may sit idle in the preferred resources pool 655 and the secondary resources pool 660 until assigned to an end user or retired. The instances of the computing resources in the secondary resources pool 660 be viewed as a to-be-retired at the earliest opportunity pool, e.g., as soon as a lease can be terminated. Thus, the "pre-fetch mode" of operation may be more desirable during times of high demand for computing resources.

Returning to FIG. 9, at block 915 the resource manager 620 receives a request for an instance of a computing resource from a user terminal 410 via the user interface module 630. At block 920, the core controller 645 fulfills the request for the instance of the computing resource with an instance of a computing resource from the preferred resources pool 655. At times when there are no available instances of computing resources in the preferred resources pool 655, the request received at block 915 may be fulfilled in accordance with the operations of blocks 710-730 of FIG. 7 corresponding to the "direct mode" of operation. That is, a new instance of a computing resource may be requested and evaluated to ensure that the instance of the computing resource complies with the minimum performance standard and/or any cost constraints. In some embodiments, a request received at block 915 for an instance of a computing resource may be fulfilled using an instance of a computing resource from the secondary resources pool 660. Short duration transient jobs and restartable workloads, i.e., workloads that are preemptable, may be scheduled to run on resources from either the preferred resources pool 655 or the secondary resources pool 660 to make use of their idle cycles. These work units are potentially preempted if the computing resource instance is needed elsewhere (in the case of resources from the preferred resources pool 655) or released when the lease expires (in the case of resources from the secondary resources pool 660).

The embodiments of methods, systems, and computer program products described herein may allow for purchase-time and periodic run-time benchmarking results of actual performance delivered by cloud resource providers and a portable measure of capacity and capacity consumption to compare application capacity requirements to the effective capacities of different resources within and across cloud resource vendors. The resource manager intermediary may be used to provide a measure of quality assurance of rented cloud resources by accepting/rejecting capacity instances that fall short of specified performance levels and costs. As a result, the delivered capacity to an end user may be improved for a given cost.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method, comprising:
   requesting instances of computing resources from a computing resource provider; evaluating a performance of each of the instances of computing resources to determine if the respective instance of the computing resource complies with a defined performance standard;
   maintaining the instances of the computing resources that comply with the defined performance standard in a first pool of resources; maintaining the instances of the computing resources that fail to comply with the defined performance standard in a second pool of resources; receiving a request for access to an instance of a computing resource; and providing access to one of the instances of the computing resources from the first pool of resources responsive to receiving the request.

2. The method of claim 1, further comprising:
   determining if the request is associated with a work unit that is pre-emptible; and
   wherein providing access to one of the instances of the computing resources comprises providing access to one of the instances of the computing resources from one of the first pool of resources and the second pool of resources responsive to determining that the request is associated with a work unit that is pre-emptible.

3. The method of claim 1, further comprising:
determining that the first pool of resources is empty responsive to receiving the request; requesting the instance of the computing resource from the computing resource provider responsive to determining that the first pool of resources is empty; evaluating a performance of the instance of the computing resource provided by the computing resource provider to determine if the performance of the instance of the computing resource complies with the defined performance standard; and providing access to the instance of the computing resource provided by the computing resource provider responsive to a determination that the performance of the instance of the computing resource complies with the defined performance standard.

4. The method of claim 1, further comprising:
periodically monitoring the performance of the one of the instances of the computing resources from the first pool of resources after providing access to the one of the instances of the computing resources from the first pool of resources to determine if the performance of the one of the instances of the computing resources from the first pool of resources continues to comply with the defined performance standard.

5. The method of claim 4, further comprising:
retiring the one of the instances of the computing resources from the first pool of resources responsive to determining that the performance of the one of the instances of the computing resources from the first pool of resources no longer complies with the defined performance standard; moving the one of the instances of the computing resources from the first pool of resources to the second pool of resources responsive to retiring the one of the instances of the computing resources from the first pool of resources; and providing access to a second one of the instances of the computing resources from the first pool of resources.

6. The method of claim 1, further comprising:
retiring the instances of the computing resources from the second pool of resources responsive to expirations of leases associated therewith, respectively.

7. The method of claim 1 wherein the performance standard comprises a cost component.

8. A system, comprising: a processor; and a memory coupled to the processor and comprising computer readable program code embodied in the memory that when executed by the processor causes the processor to perform operations comprising: requesting instances of computing resources from a computing resource provider; evaluating performance of each of the instances of computing resources to determine if the respective instance of the computing resource complies with a defined performance standard; maintaining the instances of the computing resources that comply with the defined performance standard in a first pool of resources; maintaining the instances of the computing resources that fail to comply with the defined performance standard in a second pool of resources; receiving a request for access to an instance of a computing resource; and providing access to one of the instances of the computing resources from the first pool of resources responsive to receiving the request.

9. The system of claim 8, wherein the operations further comprise: determining if the request is associated with a work unit that is pre-emptible; and wherein providing access to one of the instances of the computing resources comprises providing access to one of the instances of the computing resources from one of the first pool of resources and the second pool of resources responsive to determining that the request is associated with a work unit that is pre-emptible.

10. A computer program product, comprising:
a non-transitory computer readable storage medium comprising computer readable program code embodied in the medium that when executed by a processor causes the processor to perform operations comprising: requesting instances of computing resources from a computing resource provider; evaluating a performance of each of the instances of computing resources to determine if the respective instance of the computing resource complies with a defined performance standard; maintaining the instances of the computing resources that comply with the defined performance standard in a first pool of resources; maintaining the instances of the computing resources that fail to comply with the defined performance standard in a second pool of resources; receiving a request for access to an instance of a computing resource; and providing access to one of the instances of the computing resources from the first pool of resources responsive to receiving the request.

11. The computer program product of claim 10,
wherein the operations further comprise: determining if the request is associated with a work unit that is pre-emptible; and wherein providing access to one of the instances of the computing resources comprises providing access to one of the instances of the computing resources from one of the first pool of resources and the second pool of resources responsive to determining that the request is associated with a work unit that is pre-emptible.

* * * * *